Figures 4, 5:
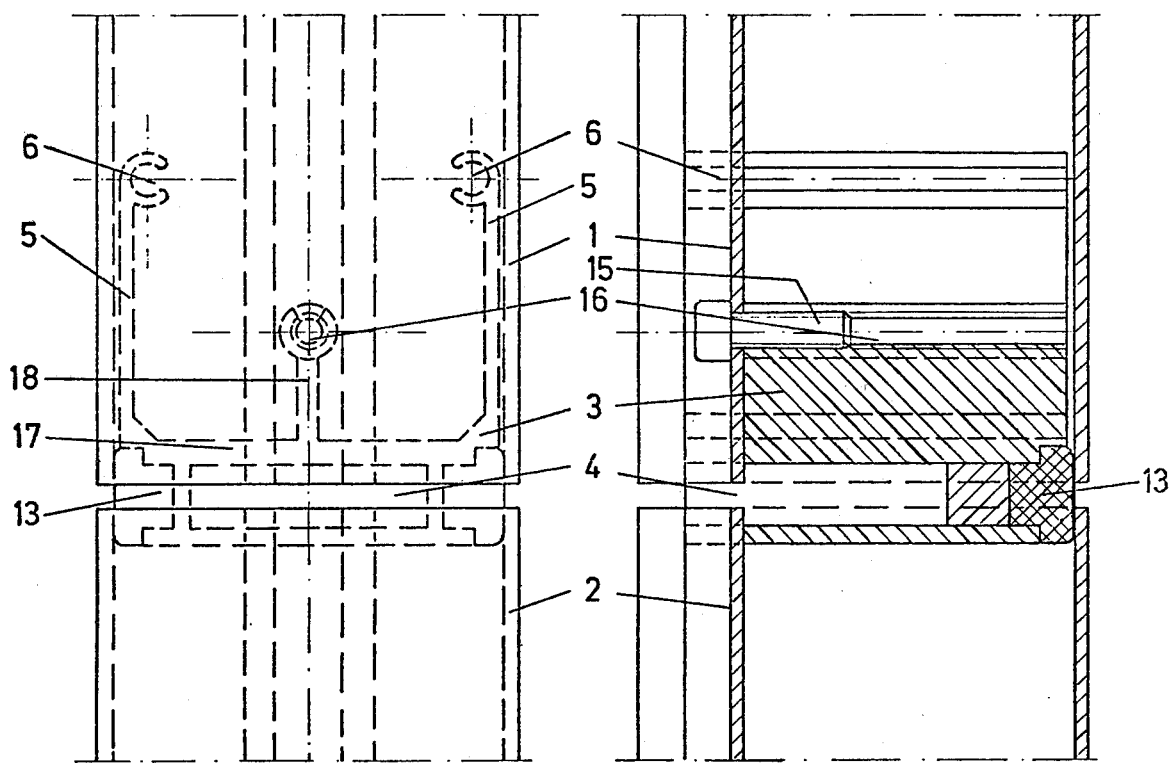

United States Patent [19]

Vollenweider

[11] 4,025,209
[45] May 24, 1977

[54] DEVICE FOR CONNECTING HOLLOW SECTIONS

[75] Inventor: Karl Vollenweider, Wagenhausen, Switzerland

[73] Assignee: Swiss Aluminium Ltd., Neuhausen am Rheinfall, Switzerland

[22] Filed: June 15, 1976

[21] Appl. No.: 696,194

[30] Foreign Application Priority Data

June 16, 1975 Switzerland .................. 7748/75

[52] U.S. Cl. ........................... 403/189; 403/264; 403/406; 52/656
[51] Int. Cl.$^2$ .................................. F16B 7/18
[58] Field of Search ............... 52/758 H, 656, 475, 52/284, 285; 403/169–176, 178, 189, 264, 292, 295, 230, 231, 297, 405, 406

[56] References Cited

UNITED STATES PATENTS

| | | | |
|---|---|---|---|
| 3,276,802 | 10/1966 | O'Brien | 52/758 H |
| 3,561,801 | 2/1971 | Chiu | 403/264 |
| 3,701,553 | 10/1972 | Vogt | 403/189 |
| 3,867,048 | 2/1975 | Endzweig | 52/758 H X |
| 3,977,800 | 8/1976 | Cassel | 403/297 X |

FOREIGN PATENTS OR APPLICATIONS 1,397,409  6/1975  United Kingdom ............... 403/297

*Primary Examiner*—Wayne L. Shedd
*Attorney, Agent, or Firm*—Ernest F. Marmorek

[57] ABSTRACT

The device described enables hollow, basically rectangular sections to be joined together either orthogonally or end-to-end and also to be joined to floors, ceilings, beams and the like. The device is a piece of extrusion basically U-shaped in cross-section which fits neatly into extrusions and by means of flanges with threaded grooves can either be connected directly to the extrusion or by drawing a bracing web into the grooves. The connecting piece is then joined to the other component or floor etc either by means of tightening the bracing web screw or by means of a flat metal plate which fits neatly into a groove in the main web of the connecting piece being secured there by screws and then screwing this plate, which projects out of the connecting piece, to the floor, ceiling etc. Provision is also made for a sealing agent which accommodates dimensional differences due to tolerances or dilation and also prevents transmission of sound.

6 Claims, 9 Drawing Figures

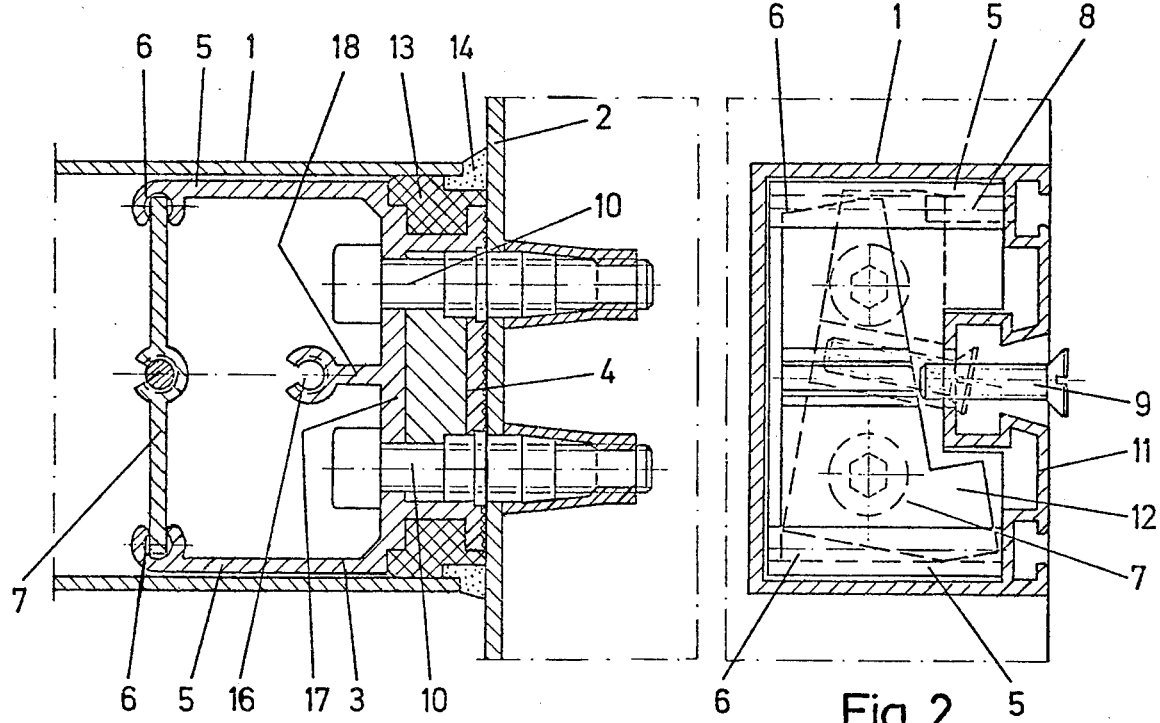
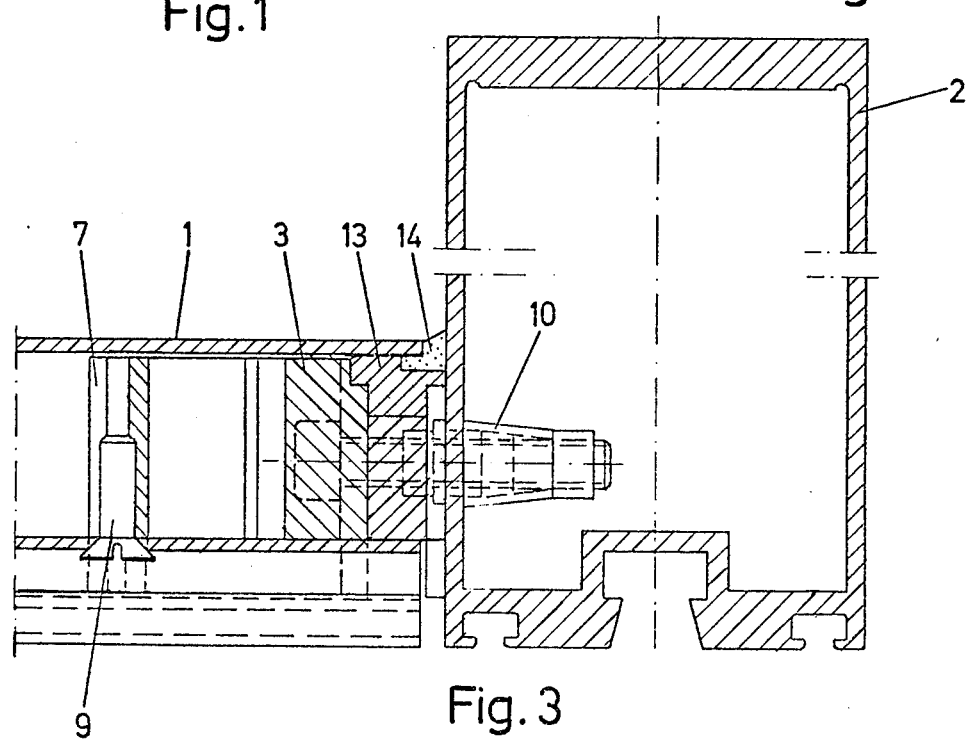

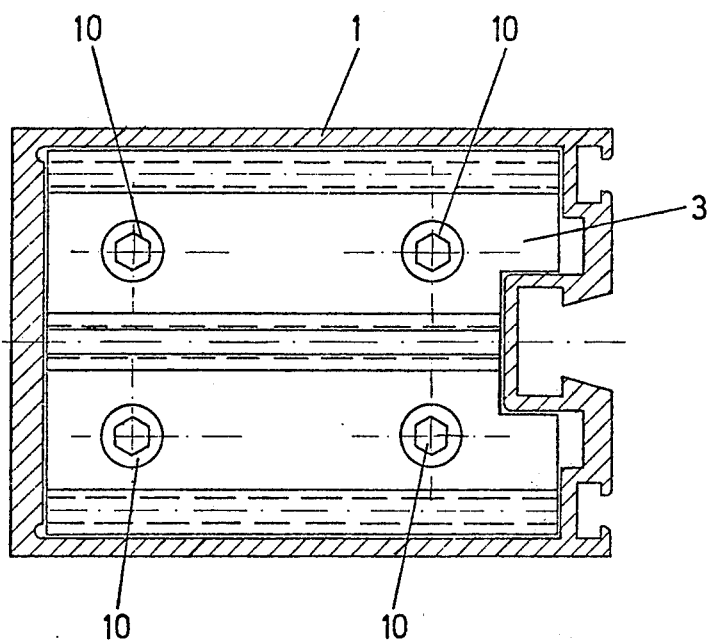
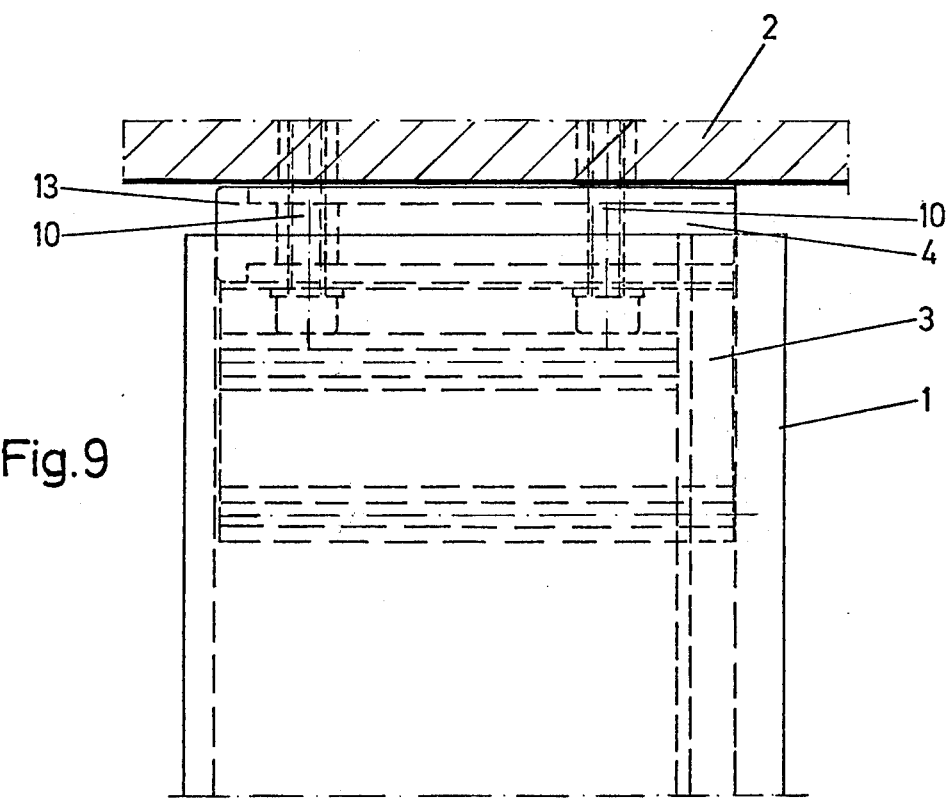

DEVICE FOR CONNECTING HOLLOW SECTIONS

The invention concerns a device for connecting hollow sections which are basically rectangular in cross section.

Such connections occur in particular in constructions involving metal-glass walls and facades, and a large number of proposals for such connections are already known.

If one considers however that such connection devices always have to fulfill a large number of requirements then one comes to the conclusion that in fact the known devices, as a rule, fulfil only some of these requirements.

The aim of the invention presented here is to provide for connection purposes a device which satisfies many varied requirements. The device of the invention makes possible in particular crosspiece connections with horizontal and vertical sections, connections to floors, ceilings and beams. It can be used anywhere where hollow sections and other construcional components have to be connected.

The device of the invention is characterized in that the connecting piece, fitted into the front end of the hollow section, is a piece of an extrusion, which is basically U-shaped in cross section transverse to the long axis of the extrusion from which it originates, and which practically fills the space in the hollow section, and the web of the device has in the basically rectangular space a groove which runs lengthwise and grooves at the free end of each of its flanges and facing each oter, and these three flanges are preferably in the shape of three-quarters of a circle in cross section, whereby the connecting piece is if desired screwed on or otherwise secured tightly by its web to the base on which the hollow section is to be connected and the hollow section is secured to the connecting piece by a single screw and the joints are sealed by a sealing agent provided in appropriate recesses on the outside of the web of the connecting piece and the sealing agent is if desired supplimented by a second sealing layer.

The invention is now described in greater detail by way of examples and with the aid of the accompanying drawings viz., FIG. 1 — The device as used for connecting a cross member; shown here in a lengthwise cross sectional view of the hollow section.

FIG. 2 — The same as in FIG. 1, viewed along the long axis of the hollow section.

FIG. 3 — The same as in FIGS. 1, 2 but shown in a view which is at right angles to FIG. 1.

FIG. 4 — The device as applied to an end-to-end connection between two similar hollow sections; shown here as a front view.

FIG. 5 — As in FIG. 4 but viewed at 90° to the view in FIG. 4 and illustrated in cross section.

Figure 6:
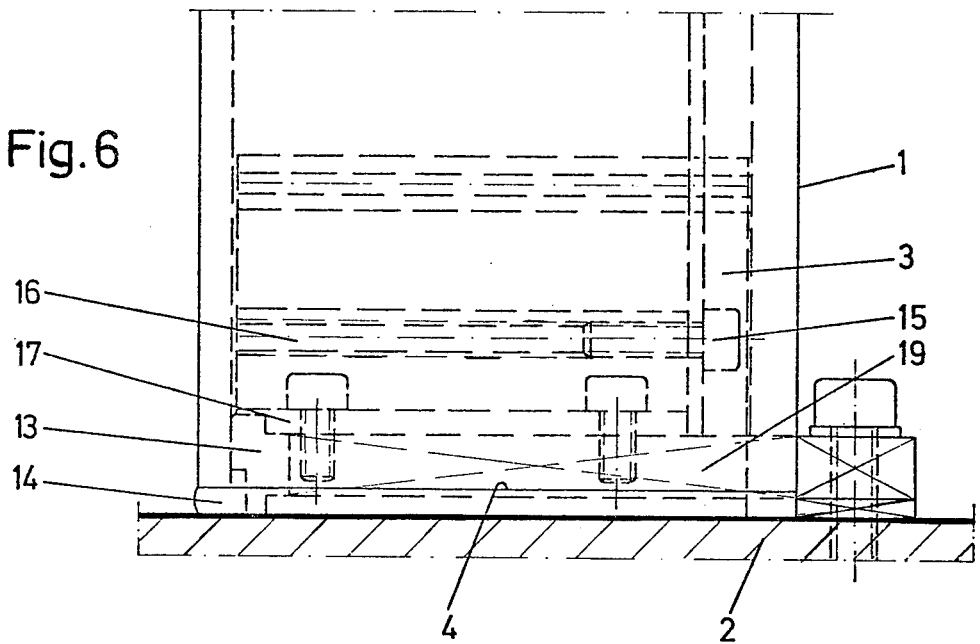

FIG. 6 — The device as applied to secure a hollow section e.g. to the floor, sectioned here down the length of the section.

Figure 7:
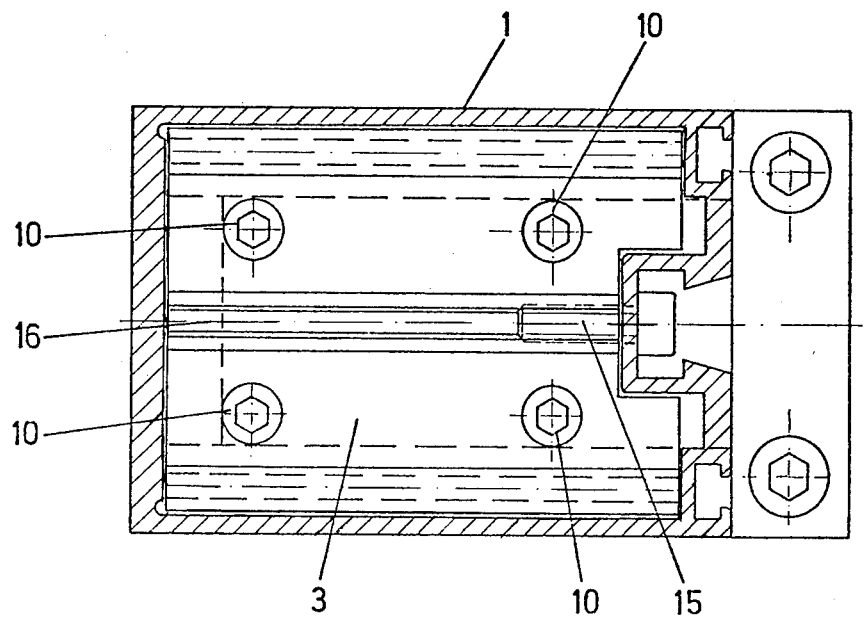

FIG. 7 — The same as in FIG. 6, but shown in transverse cross section.

FIG. 8 — The device as applied to secure a hollow section to a ceiling, a beam or the like and shown here in transverse cross section.

FIG 9. — A longitudinal view of the same as in FIG. 8.

The hollow section is indicated by 1 and the component to which the hollow section 1 is to be fixed i.e. the base by 2. The hollow section 1 is basically rectangular in cross section, whereby grooves, ribs and the like may be present too (see FIGS. 2, 7, 8).

The connecting piece 3 is shown in place, inserted in the end of the hollow section 1 which is to be secured to the other component. This connecting piece 3 is a piece cut off an extrusion and cut to size such that it fills as completely as possible the space inside the hollow section 1. It is essentially U-shaped in cross section (see FIG 1, 4). The web 17 has a space 4 which is basically rectangular in cross section. This is, as is to be shown later, of importance when applying the device for the purpose of connecting components to a floor (FIG. 6). The flanges 5 of the connecting piece 3 have facing grooves 6 at their free ends. These grooves 6 at their free ends. These grooves 6 are provided to accommodate a bracing web 7 which is pushed into the grooves 6. If however such a bracing web is not necessary, then securing pins 8 can be inserted into these grooves through appropriate holes in the wall of the hollow section 1, and thus serve as an additional means of securing the junction of the section 1 to the connecting piece. In order to ensure good fit for the pins 8 the grooves 6 are in cross section the shape of a ¾ circle.

The fixing of the connecting piece to the base is done by screws, grooves or similar means.

If for example in the case of a cross piece connection (FIG. 1–3), the hollow section is pushed onto the connecting piece 3, then it is fixed in place by the bracing web 7 and the screw 9. The bracing web 7 is a flat piece of metal which is pushed into the grooves 6 of the connecting piece 3. In outline it is irregular in shape and multi-sided, with one wing 12 in the same plane pointing towards one of the walls 11 of the section 1. Its dimensions are in accordance with those of the interior of the hollow section. In the region of its short axis it is provided with a threaded hole, the long axis of which forms an acute angle with one of the transverse axes of the section after the components have been tightened up into place. When the screw 9 which is introduced through a hole made in the wall 11 of the section 1 in line with the threaded groove in the bracing web 7, and screwed into this threaded groove, the web 7 turns with the screw 9.

The short sides of the bracing web 7 are thus pressed into the grooves 6 and the wing 12 of the web 7 against the wall 11 of the section 1. This way the connecting piece 3 is braced in all directions in the hollow section and production tolerances are readily accommodated. The hole for the screw in the extrusion wall 11 is the only one which is necessary for a crosspiece connection.

The sealing of the joints is achieved in all applications by means of a sealing agent 13 (e.g. rubber) running round the connecting piece and fitted into appropriate recesses on the outer sides of the web of the connecting piece. This can usefully be supplimented by a silicone seal 14 which covers the joint between the rubber seal 13 and the base 2.

In the case of an end-to-end connection between the hollow section 1 and e.g. a second section of similar cross section, the connecting piece 3 and the rubber seal are inserted in one of the ends of the hollow section as with a crosspiece connection.

Securing the hollow section 1 to the connecting piece 3 is done e.g. by a screw 15 which is introduced through a hole in the hollow section and engages in the threaded groove 16 provided at the free end of a projecting flange 18 at the middle of the web 17 of the connecting piece 3, and lying parallel to the flange 5. The lower part of the web 17, together with a part of the rubber seal 13, are pushed into the front end of the second section 2.

The connecting device can also be used for connecting a hollow section to a floor (FIG. 6, 7), to a ceiling or to a beam (FIG. 8, 9). In order to be able to fix the post 1 to a floor, a flat piece of metal 19 is pushed into the space 4 in the web 17 of the connecting piece, the length of the metal piece 19 being greater than the breadth of the connecting piece, so that the flat piece 19 projects out at least from one end of the connecting piece. This piece of metal 19 is screwed to the connecting piece and the part projecting out is screwed to the floor. Rubber and silicone sealing 13, 4, compensate for variations due to dilation and prevent transmission of sound. The hollow section 1 and the connecting piece 3 are joined together via the threaded groove 16 on the connecting piece as in the example for the end-to-end connection.

In the case of a connection to a ceiling or a beam (FIG. 8, 9) the connecting piece 3 is inserted in the upper end of the hollow section 1. It can be connected to the hollow section in the manner described in the two previous examples. Generally, sufficiently long screws 10 are pushed through the web 17 of the connecting piece 3 into the ceiling. The rubber seal 13 accommodates variations due to dilation and prevents transmission of sound.

What I claim is:

1. A device for connecting hollow sections which are basically rectangular in cross section in which the connecting piece (3) inserted in one end of the hollow section (1) is a section cut off an extrusion, which is basically U-shaped in cross section perpendicular to the long axis of the extrusion, and practically completely fills the space inside the hollow section (1), and the web (17) of the connecting piece (3) has a basically rectangular space in it and the flanges (5) of the piece (3) have, facing each other at the free ends, lengthwise-running grooves which are preferably in cross section in the form of ¾ circles, whereby the connecting piece is secured to the base (2), on which the section (1) is to be fixed, by its web (17) if desired by screwing or by some other means, and whereby the hollow section is secured to the connecting piece by one single screw (9) and the connection joints are closed by a sealing agent (13) running round the connecting device and fitted into appropriate grooving on the outside of the web (17) of the connecting piece and if desired supplimented by a second (e.g. silicone) seal (14).

2. A device according to claim 1 in which in connecting a cross piece, where the hollow section is to be connected at right angles to a long side of the base (2), a bracing web (7) is forced between the flanges (5) of the connecting piece and in the grooves (6) of the said flanges (5).

3. A device according to claim 2 in which the bracing web (7) is a flat piece of metal, which is perpendicular to the long axis of the hollow section and has a threaded groove which forms an acute angle with one of the transverse axes of the hollow section into which groove the screw (9) joining the hollow section (1) and the connecting piece (3) together engages and by tightening up turns the bracing web into the plane of the section, so that the opposite lying faces of the bracing web in the grooves of the flanges on the connecting piece are pressed against these flanges (5) and the wing (2) in the plane of the bracing web (7) positioned in the direction of the transverse axis of the hollow section is pressed against the wall of the hollow section (1).

4. A device according to clam 1 in which in making an end-to-end connection between the hollow section (1) and a similar section (2), the first hollow section (1) is secured to the connecting piece by a screw (15) which engages in a threaded groove (16) in a flange (18) on the connecting piece (3) parallel to the connecting piece flanges (5).

5. A device according to claim 1 in which in making a connection between the hollow section (1) and a floor a flat piece of metal (19) is inserted into and completely fills the space (4) in the web (17) in the connecting piece and projects out of one side of that side space (4) and is screwed to the floor at the part which projects out while the connecting piece (3) is also screwed to the flat piece of metal (19).

6. A device according to claim 1 in which in making a connection to a ceiling the connecting piece (3) is screwed directly on to the ceiling and an elastic sealing component (13) is incorporated and accommodates and compensates for movement of the hollow section due to dilation.

* * * * *